United States Patent [19]

Corsmeier et al.

[11] Patent Number: 5,088,775
[45] Date of Patent: Feb. 18, 1992

[54] SEAL RING WITH FLANGED END PORTIONS

[75] Inventors: Donald M. Corsmeier, Wyoming; Nicholas P. Poccia, Oxford, both of Ohio

[73] Assignee: General Electric Company, Cincinnati, Ohio

[21] Appl. No.: 559,113

[22] Filed: Jul. 27, 1990

[51] Int. Cl.5 .................. F16L 21/00; F16L 23/00
[52] U.S. Cl. ........................... 285/374; 285/24; 285/304; 285/407; 285/409; 285/421; 403/338; 277/128
[58] Field of Search .......... 285/24, 304, 367, 406, 285/407, 408, 409, 410, 411, 420, 421, 399, 403, 374; 403/335, 338; 277/128, 147

[56] References Cited

U.S. PATENT DOCUMENTS

| 2,553,220 | 5/1948 | Troeger | 403/338 |
| 2,579,619 | 12/1951 | Scott | 285/1 |
| 2,773,709 | 12/1956 | Smith | 285/187 |
| 3,367,108 | 2/1968 | Camboulives | 60/39.32 |
| 4,311,313 | 1/1982 | Vedova et al. | 285/268 |
| 4,411,134 | 10/1983 | Moir | 285/344 |
| 4,427,220 | 1/1984 | Decker | 285/351 |
| 4,468,842 | 9/1984 | Perry et al. | 24/279 |
| 4,542,923 | 9/1985 | La Crosse et al. | 285/406 |
| 4,563,795 | 1/1986 | Fournier | 24/279 |
| 4,648,434 | 3/1987 | Melzi et al. | 403/344 |
| 4,715,565 | 12/1987 | Wittmann | 285/407 |
| 4,879,883 | 11/1989 | Bruner | 403/290 |
| 4,919,453 | 4/1990 | Halling et al. | 24/279 |
| 4,921,401 | 5/1990 | Hall et al. | 403/344 |

FOREIGN PATENT DOCUMENTS 1437030 5/1976 United Kingdom.

Primary Examiner—Randolph A. Reese
Assistant Examiner—Tim Aberle
Attorney, Agent, or Firm—Jerome C. Squillaro

[57] ABSTRACT

Large and small seal ring segments are interconnected to allow for circumferentially overlapping sliding engagement therebetween. The seal ring segments form an annular seal ring having a radial flange which is mounted within an annular radial groove formed in one end of a conduit. An adjoining conduit is formed with a sealing band having a spherical contour for engaging a cylindrical base portion of the seal ring with an axially slidable and pivotable fit.

13 Claims, 6 Drawing Sheets

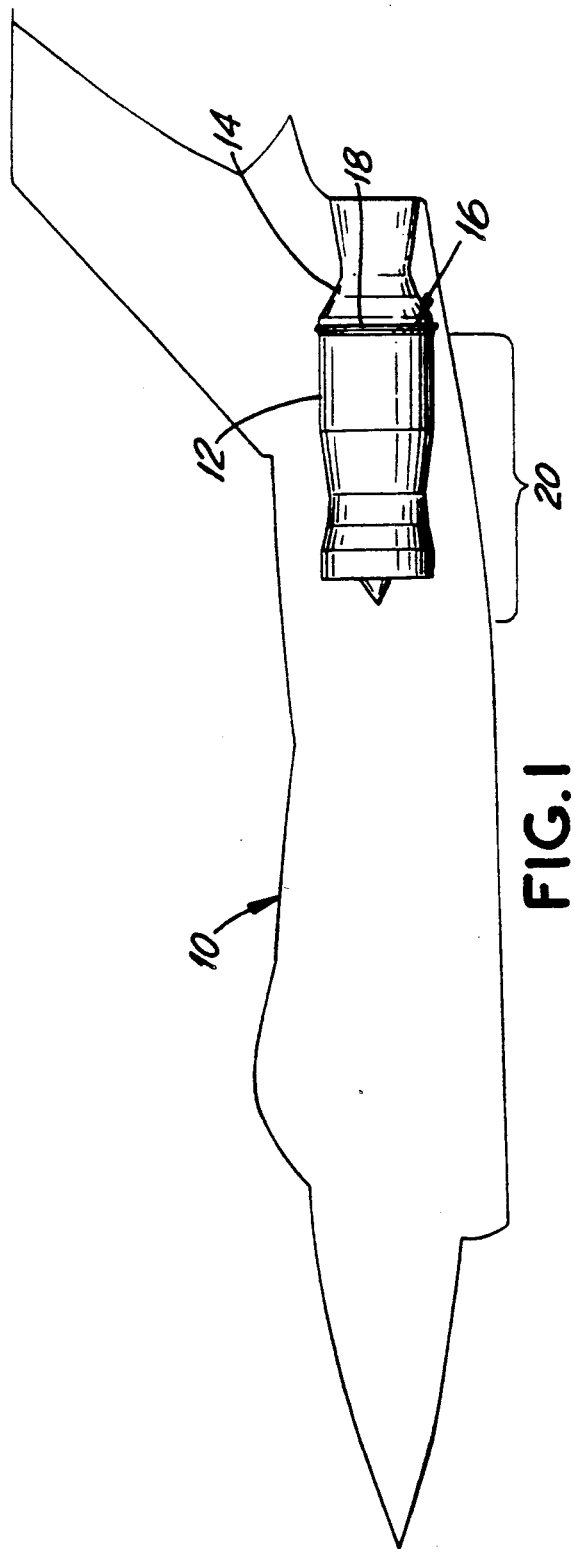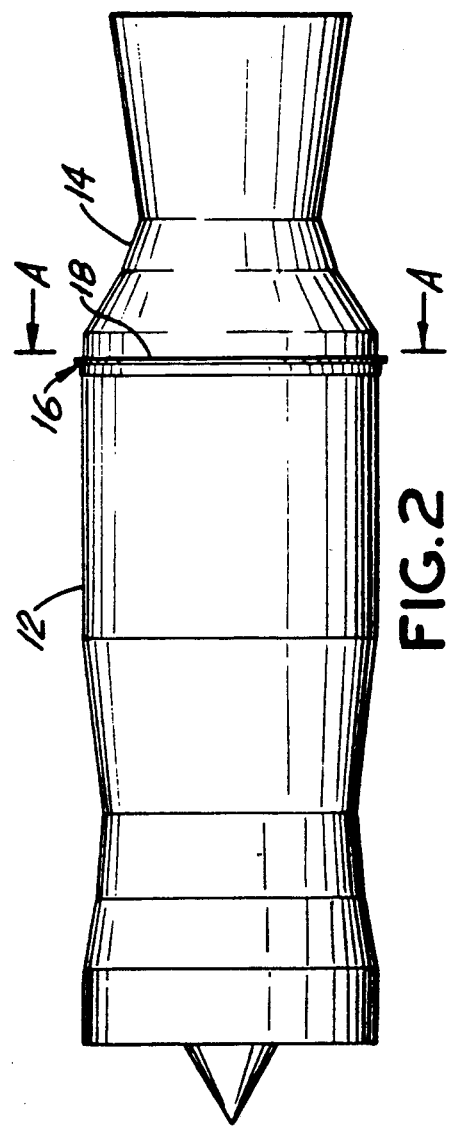

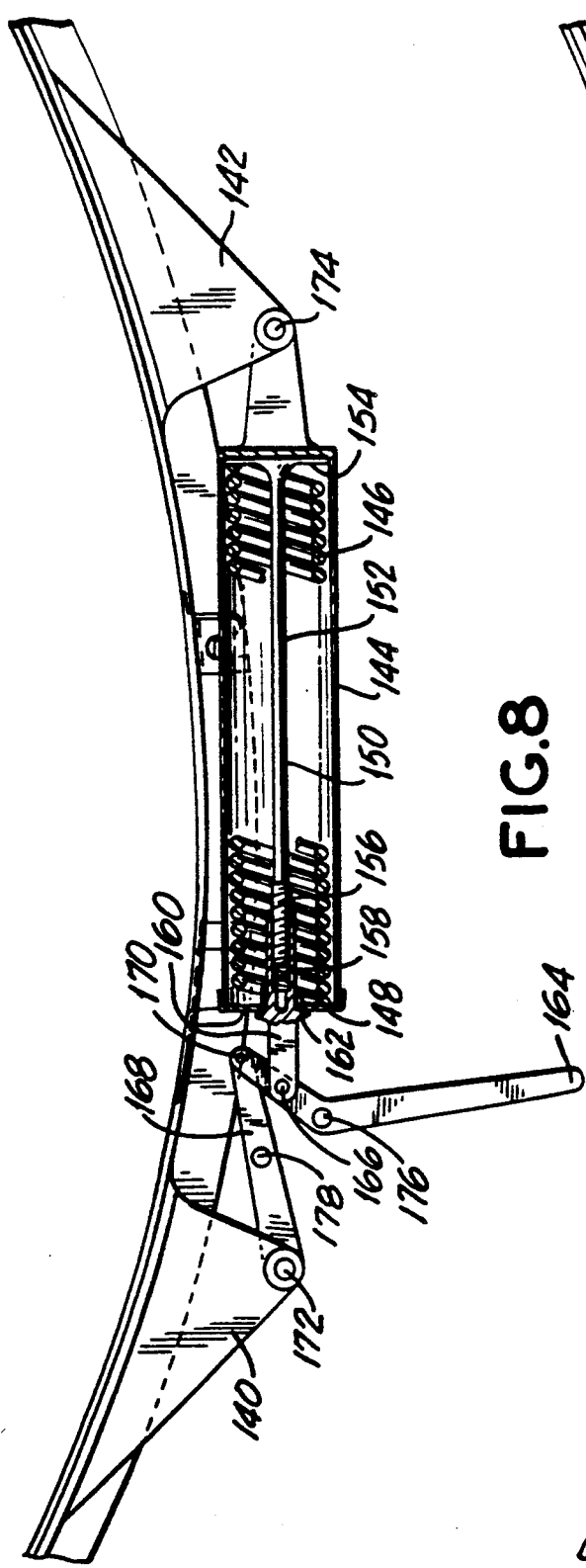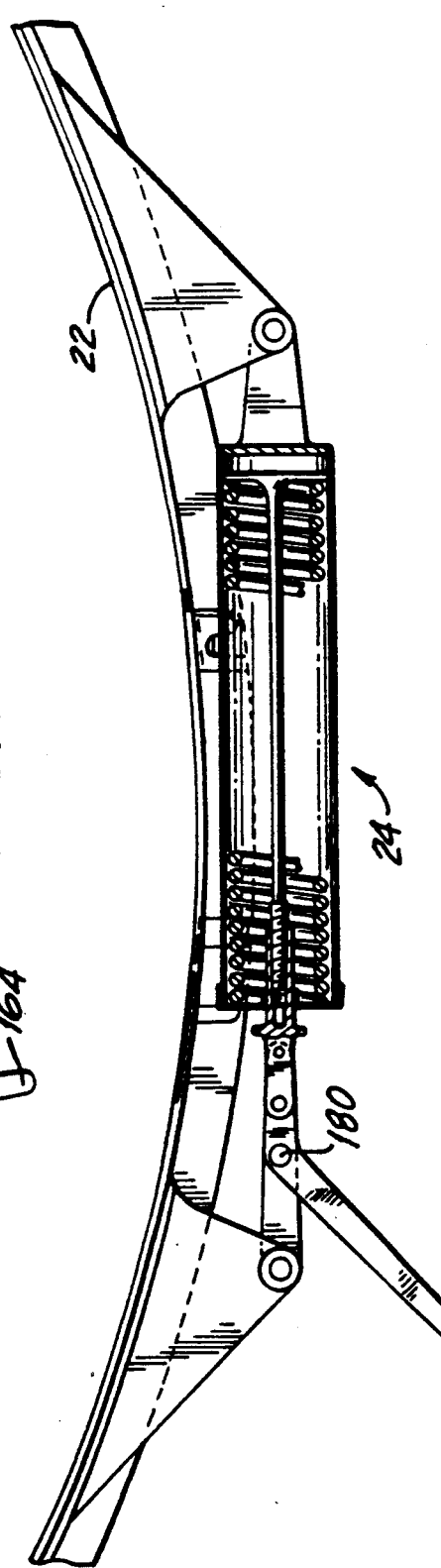
FIG.8
FIG.9

SEAL RING WITH FLANGED END PORTIONS

The Government has rights in this invention pursuant to Contract No. F33657-83C-0281 awarded by the Department of the Air Force.

BACKGROUND OF THE INVENTION

1. Field of the Invention

The present invention is generally directed to a seal for maintaining a fluid tight junction between a pair of ducts or pipes and particularly concerns a seal ring for sealing between an aircraft jet engine and its exhaust duct and nozzle.

2. Description of Prior Developments

Numerous types of seal rings have been designed for sealing against fluid leakage through the junction formed between a pair of axially connected ducts or pipes. Notwithstanding the large number of seal designs currently available, a need currently exists for a seal ring which meets the particular requirements for sealing between an aircraft jet engine and a jet engine exhaust duct which is mounted to and supported by the aircraft airframe. Prior production jet engine aircraft designs which rigidly mounted a jet engine to its exhaust duct and nozzle did not require the seal provided between the jet engine and exhaust duct to accommodate as many variables or fulfil as many functions as those associated with modern aircraft designs having airframe-mounted, isostatically-supported exhaust ducts.

More particularly, a seal ring which seals the unction between a jet engine casing and an associated airframe-supported exhaust duct and nozzle must allow the exhaust duct and nozzle to move relative to the jet engine casing, yet facilitate engine installation and removal while minimizing the leakage of exhaust gasses during engine operation. Specifically, such a seal ring must accommodate relative axial motion across the sealed junction between the engine casing and exhaust duct as well as accommodate angular misalignments between the longitudinal axes of the engine casing and exhaust duct. This seal ring must further accommodate radial misalignment or eccentricity between these sections of the jet engine and must compensate for changes in diameter between these sections due to thermal expansion and contraction and pressure loading.

SUMMARY OF THE INVENTION

The present invention has been developed to meet the needs noted above and therefor has as an object the provision of a seal ring for sealing against fluid leakage between a pair of annular duct members while accommodating relative movements and misalignments therebetween.

Another object of the invention is to provide a seal ring for sealing between an aircraft jet engine exhaust duct which is mounted to and supported by an aircraft airframe and a separately supported jet engine.

Still another object of the invention is to provide a seal ring which maintains an effective fluid seal between an aircraft jet engine and an associated jet engine exhaust duct while allowing for relative axial and radial movement therebetween and while accommodating relative angular (axial) and radial (eccentric) misalignments as well.

Yet another object of the invention is to provide a seal ring which facilitates the installation and removal of a jet engine to and from a jet engine exhaust duct which is, with respect to the jet engine, separately mounted to an aircraft airframe.

Briefly, the present invention provides a seal ring assembly which includes a large ring segment circumferentially interconnected to a small ring segment with a circumferentially tensioned or spring biased fit. Tension may be applied across the interconnection with a lever-operated spring assembly which allows predetermined sliding circumferential movement between the large and small ring segments. This sliding movement is analogous to that provided between the free ends of a piston ring seal.

In order to accommodate relative axial motion between the annular members being sealed, one of the members is formed with a spherical outer surface portion for sealingly engaging an inner cylindrical surface defined by the ring segments. This type of spherical or swiveling sealing engagement also allows for relative axial misalignment between the sealed members. Relative radial movement between the sealed members is accommodated by forming the member without the spherical surface with an annular radial flange formed with an annular internal slot or groove which opens radially inwardly to sealingly receive an annular radial flange projecting radially outwardly from the ring segments.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings:

FIG. 1 is a schematic view of a jet aircraft showing the mounting location of a jet engine and exhaust nozzle;

FIG. 2 is a schematic view of the jet engine of FIG. 1 showing the mounting location of a seal ring designed according to the present invention;

FIG. 8 is a view similar to FIG. 6 showing the addition of a tensioning assembly in an relaxed position;

FIG. 9 is a view of FIG. 8 showing the tensioning assembly in an operative tensioned position.

In the various figures of the drawings, like reference characters designate like parts.

DETAILED DESCRIPTION OF THE PREFERRED EMBODIMENT

Figure 3:
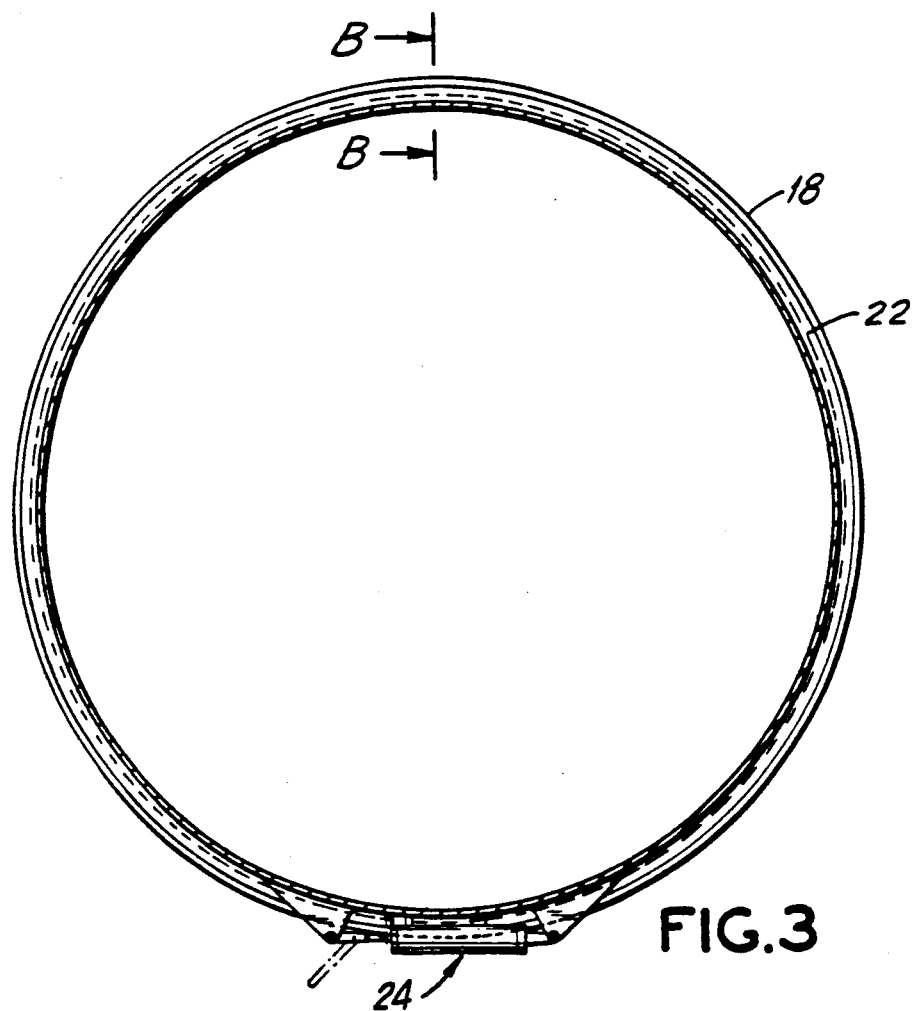
FIG. 3 is an aft elevation view of the seal ring of FIG. 2 taken along line A—A of FIG. 2.

The present invention will now be described in conjunction with the drawings, beginning with FIGS. 1 and 2 which schematically show the application of the invention to a jet aircraft assembly. Aircraft 10 includes a jet engine 12 connected to an exhaust duct or nozzle 14 via an articulated joint 16. In this particular application, both the jet engine 12 and duct 14 are independently mounted to the frame of the aircraft 10.

This type of independent mounting necessitates the provision of a specialized seal assembly 18 for preventing the leakage of exhaust gasses through joint 16 during engine operation. Because of the limited space available in the engine installation and removal bay 20, the seal assembly 18 must also facilitate the axial joining of the engine 12 to its exhaust duct 14. Generally, the seal assembly 18 includes axially spaced sealing surfaces provided on the engine 12 and duct 14 which coact with a two piece seal ring described in detail hereinbelow.

Figure 4:
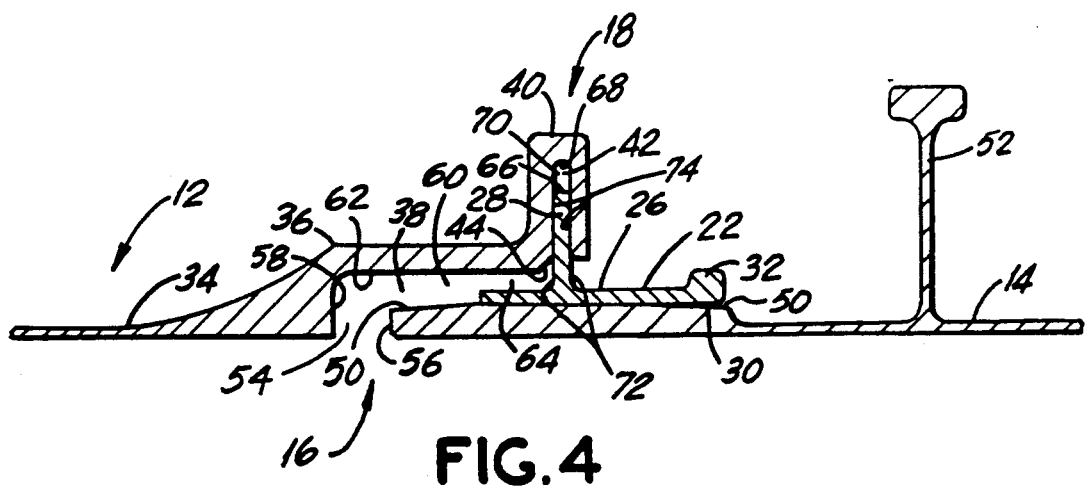
FIG. 4 is an enlarged fragmental axially sectioned view taken along line B—B of FIG. 3 of the seal assembly.

As seen in FIG. 3, the seal assembly 18 includes a seal ring 22 which is provided with a tensioning assembly 24 for circumferentially clamping the seal ring 22 about joint 16. As seen in FIG. 4, the seal ring 22 is formed with an axially extending annular base or band portion 26 and a radially outwardly projecting annular sealing flange 28. The inner surface 30 of the annular band portion 26 is preferably formed with a generally cylindrical contour or profile. An annular stiffening rib 32 may be formed on the annular band portion 26 to add rigidity to the seal ring 22.

As further seen in FIG. 4, the rear axial end portion of engine 12 terminates in an annular duct or conduit 34. Conduit 34 is formed with a radially enlarged axially-extending tubular collar portion 36 which defines an annular pocket or recess 38 in the form of a counter-bore. A radially outwardly extending annular flange 40 which projects from the collar portion 36 is formed with an annular radial slot or groove 42 which opens radially inwardly to sealingly engage the annular sealing flange 28 with a close radially sliding fit. The opening of groove 42 may be chamfered at 44 to facilitate entry of the sealing flange 28 during assembly.

The forward portion of the exhaust duct 14 is formed with an arcuate and preferably spherical surface portion 50 for sealingly engaging the inner surface 30 of annular band portion 26 with a pivotable, axially-slidable fit. An annular stiffening ring 52 may be formed o the exhaust duct 14 for controlling the circularity of the exhaust duct adjacent to its spherically banded surface portion 50. An axial clearance 54 is provided between the axial end face 56 of exhaust duct 14 and the confronting radial face 58 of annular pocket 38 to allow for relative axial movement between engine 12 and exhaust duct 14.

A radial clearance 60 is provided between the inner wall 62 of the tubular collar portion 36 and the spherical surface portion 50 of exhaust duct 14 adjacent to its axial end face 56. Clearance 60 allows for the unobstructed pivotal or swiveling movement between surfaces 50 and 30 without interference with engine conduit 34. Additional annular radial clearance is provided between inner wall 62 and band portion 26 at 64. Still further radial clearance is provided between the outer tip 66 of sealing flange 28 and the bottom 68 of radial groove 42 at 70.

Radial clearances 60 and 70 allow for significant relative radial movement between conduit 34 and exhaust duct 14 while maintaining an effective seal across joint 16. More particularly, as the engine 12 and conduit 34 move radially due to thermal expansion and contraction and/or pressure loading or acceleration forces, an effective seal is maintained by the close sliding fit between the parallel walls 72 of radial sealing flange 28 and the complimentary or mating parallel walls 74 of radial groove 42.

Figure 5:
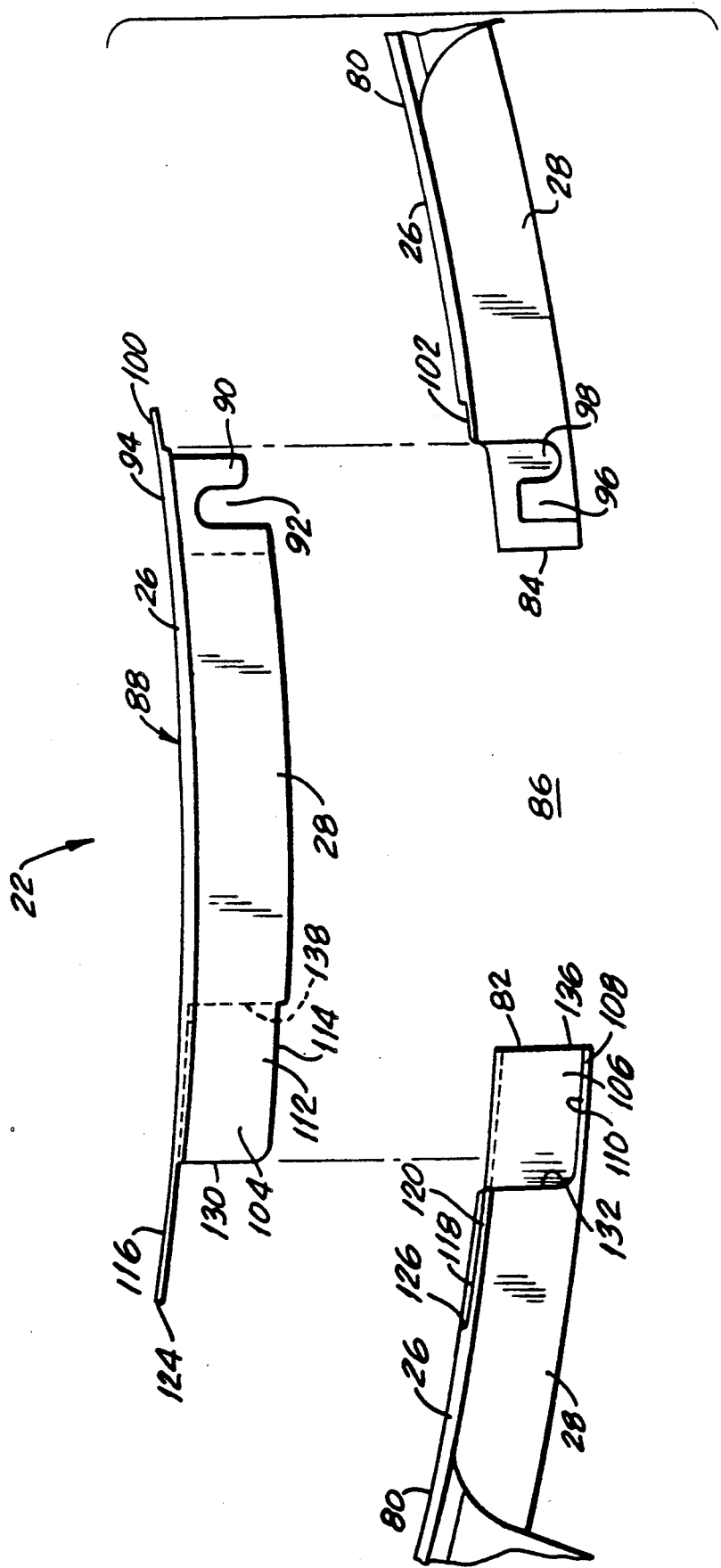
FIG. 5 is an enlarged fragmental exploded view of the interconnection between the large and small ring segments.

Additional details of the seal assembly 18 are shown in FIG. 5 wherein seal ring 22 is seen as including a large one-piece ring segment 80 having free ends 82, 84 between which a circumferential gap or space 86 is defined. A small ring segment 88 is provided for closing gap 86 thereby forming a substantially continuous 360° ring along with the large ring segment 80. As discussed further below, this two-piece construction facilitates the mounting of the seal assembly 18 about joint 16 and specifically simplifies the mounting of seal ring 22 within annular flange 40 and over spherical surface 50.

Small ring segment 88 is circumferentially fixed and anchored to free end 84 of the large ring segment 80 with a tongue and groove fit as seen in FIG. 5. A radially outwardly extending tongue 90 and a radially inwardly extending groove 92 are formed in the radial flange 28 adjacent one end portion 94 of the small ring segment 88. A corresponding or complimentary tongue 96 and groove 98 are formed adjacent free end 84 of the large ring segment 80 for respectively engaging and receiving groove 92 and tongue 90 on the small ring segment 88.

Figure 7:
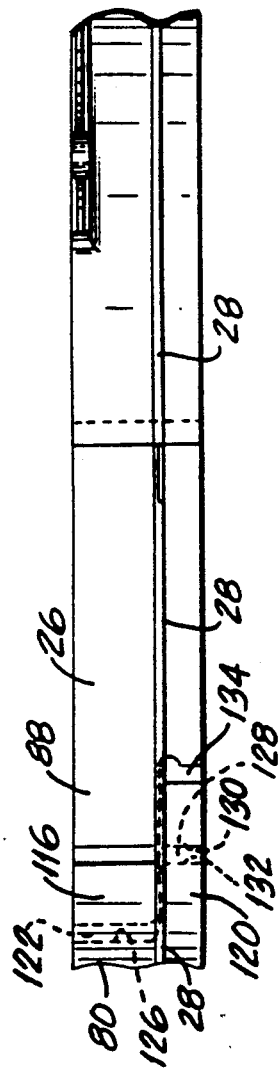
FIG. 7 is a bottom view of FIG. 6.

As seen in FIG. 7, the tongues 90, 96 and grooves 92, 98 are each respectively formed with an axial width and axial depth of approximately half the axial thickness of radial flange 28. In this manner, the tongue and groove fit not only circumferentially anchors the small ring segment 88 to one end of the large ring segment 80, but also provides relative axial restraint and alignment between these segments along their radially and circumferentially extending engaged faces. This engagement also provides a uniform axial thickness about the circumference of radial flange 28.

When the tongue and groove portion of the seal ring 22 is snugly fitted within the radial groove 42 in annular flange 40, a virtually gas tight seal is formed between these engaged ring faces. A 360° seal is also formed between the radial flange 28 and radial groove 42 which serves to axially couple or clamp the radial flange therein. A lip 100 is formed on end portion 94 of small ring segment 88 for seating within and overlapping a corresponding recess 102 formed in the radially inner face of annular band portion 26.

Figure 6:
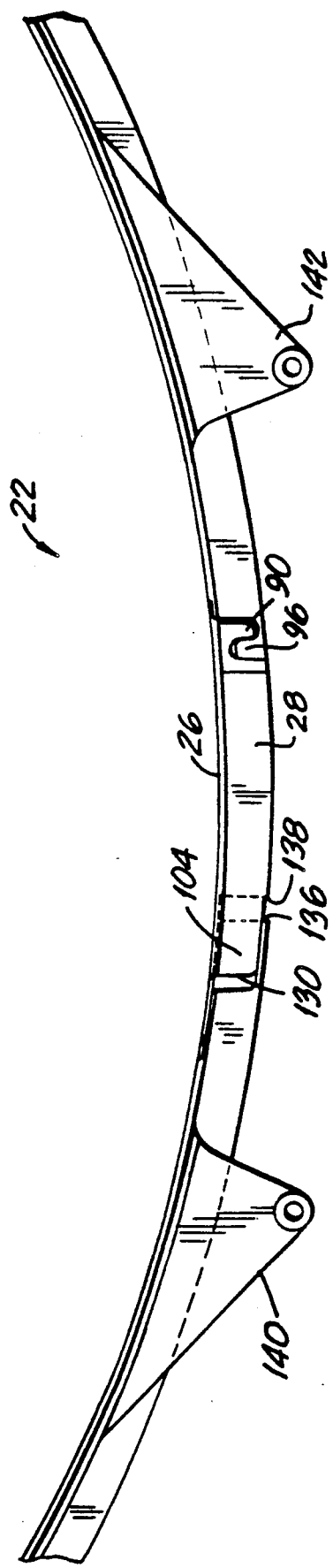
FIG. 6 is an aft view looking forward showing the ring segments in an assembled condition.

A circumferentially sliding interconnection is provided between end portion 104 of the small ring segment 88 and the free end 82 of the large ring segment 80. As can be seen in FIGS. 5, 6, and 7, a recess 106 having a depth of about half the axial width of radial flange 28 is formed in flange 28 adjacent the free end 82 of the large ring segment 80. An axial ridge or step 108 is formed along the radially outer edge of flange 28. Step 108 is contoured with a circumferential seat 110 in the form of a circle segment which is generally coaxial and concentric with the seal ring 22.

A circumferentially extending tongue 112 having an axial width of about half the axial width of radial flange 28 is formed with a radially recessed outer edge 114 for seating upon seat 110 with a circumferentially sliding complementary fit. As with the tongue and groove connection described previously, the axial abutment of circumferential tongue 112 against the complimentary recessed face of recess 106 forms a virtually gas tight interface when this overlapped circumferential portion of the seal ring 22 is fitted or wedged within radial groove 42 in flange 40. This overlapped interface is adapted to accommodate relative circumferential sliding engagement between the large and small ring segments while maintaining an effective seal therebetween.

A lip 116 extends circumferentially from end portion 104 of small ring segment 88 for registration within recess 118 formed in the radially inner surface of annular band portion 26. As seen in FIG. 7, lip 116 extends axially over only a portion of the full axial length of annular band portion 26 to axially abut a complementary lip 120 formed on band portion 26 of the large ring segment 80. A circumferential clearance 122 is provided between the end 124 of lip 116 and the radial step 126 formed on the inner end of recess 118.

Another circumferential clearance 128 is provided between the end face 130 of end portion 104 of the small ring segment 88 and a radially extending axial step 132 formed at the edge of recess 106 on the large ring segment 80. Still another clearance 134 is provided between the end face 136 of free end 82 of large ring segment 80 and a radially extending axial step 138 formed at the inner end of tongue 112 formed on the small ring segment 88. Clearances 122, 128 and 134 allow for the circumferential expansion and contraction of the seal ring 22 while a gas tight joint is maintained between the relatively sliding and contacting surfaces which overlap between the free end 82 of the large ring segment 80 and the end portion 104 of the small ring segment 88.

As best seen in FIG. 6, mounting lugs 140, 142 are respectively formed on free ends 82, 84 of the large ring segment 80 for supporting the tensioning assembly 24 (FIG. 3) on the seal ring 22. Tensioning assembly 24 is shown pivotally pinned to the lugs 140, 142 in FIGS. 8 and 9. Although a simple turnbuckle may be used for applying tension to the seal ring 22 via mounting lugs 140, 142, a more convenient tensioning assembly includes the lever-operated spring-biased assembly 24 shown in FIGS. 8 and 9.

Tensioning assembly 24 includes a canister 144 within which a coil spring 146 is compressively retained by end cap 148. A spring compressor 150 includes a stem portion 152, a spring seat 154 and a threaded end portion 156. End portion 156 is received within a threaded axial bore 158 in a flanged pin 160 which passes through end cap 148 with a sliding fit.

Flange 162 limits the axial location of pin 160 within canister 144 when the tensioning assembly 24 is in a released position as shown in FIG. 8. An axially compressive spring preload may be applied to coil spring 146 in its FIG. 8 position by effecting relative rotation between the flanged pin 160 and spring compressor 150 to set the degree of axial engagement between the threaded end 156 of stem 152 and the threaded bore 158 in flanged pin 160.

A dog leg lever 164 is pivotally pinned to the outer end of flanged pin 160 at joint 166 and further pivotally pinned to the end of link 168 at joint 170. Link 168 is pivotally pinned to lug 140 at joint 172 and cannister 144 is pivotally pinned to lug 142 at joint 174. It can be seen from a comparison of FIGS. 8 and 9 that when lever 164 is rotated from its FIG. 8 unactuated position to its FIG. 9 operative position, the coil spring 146 is further compressed within cannister 144 to provide a predetermined tension between lugs 140 and 142. This tension is thus applied across the overlapping sliding fit formed between the free end 82 of the large ring segment 80 and end portion 104 of the small ring segment 88. Through bore 176 on lever 164 and through bore 178 on link 168 may be aligned as seen in FIG. 9 and locked in this operative position with a pin or bolt 180 which passes through the through bores.

The installation of the seal ring 22 about joint 16 may be carried out as follows. With the engine 12 removed from the airframe of aircraft 10, the large ring segment 80 is circumferentially constricted to a smaller diameter and is radially inserted into slot 42 of flange 40 of conduit 34. Once inserted, the large ring segment 80 is allowed to expand radially outwardly into the groove 42. The small ring segment 88 is then installed into slot 42 to engage and couple with the large ring segment 80 as seen in FIGS. 5, 6, and 7.

After the ring segments 80, 88 are installed in groove 42, the tensioning assembly 24 is attached to the lugs 140, 142 on the large ring segment 80. The engine 12 is then installed by raising it into the engine bay 20 and then translating the engine aft in the aircraft 10 so that the large and small seal ring segments freely slide over the spherical surface 50 of the exhaust duct 14.

The large ring segment 80 is designed so that in its free state, i.e. as initially disposed within groove 42, the large ring segment 80 expands to a diameter greater than that of the spherical surface 50 thereby permitting easy installation over the spherical surface. After the engine 12 is mounted securely in the aircraft airframe, the seal ring 22 is circumferentially tightened by pulling the lever 164 of tensioning assembly 24. A bolt 180 is then preferably installed through bores 176 and 178 to lock the tensioning assembly 24 in place. When thus actuated, the tensioning assembly 24 causes the seal ring 22 to be resiliently circumferentially clamped around joint 16 thereby effecting a virtually gas tight 360° seal.

During operation, the seal ring 22 accommodates relative axial motion between the engine 12 and the exhaust duct 14 by sliding axially on the spherical surface 50 formed on the exhaust duct. The seal ring 22 also accommodates angular misalignment between the engine and the exhaust duct by swiveling and sliding about the spherical surface 50 on the exhaust duct. Radial misalignment between the engine and the exhaust duct is accommodated by the annular flange 28 sliding radially in the radial groove 42 in the flange 40 of engine conduit 34.

Changes in diameter between the engine case or conduit 34 and exhaust duct 14 are accommodated by the seal ring 22 circumferentially expanding or contracting as necessary about and between the free end 82 of the large ring segment 80 and end portion 104 of the small ring segment 88. Seal assembly 18 experiences minimal leakage because the tensioning assembly 24 is constantly pulling the seal ring 22 snugly around joint 16 to ensure an effective seal between spherical surface 50 and band portion 26.

The seal assembly 18 is preferable to a simple piston ring type design because seal assembly 18 weighs less than a conventional piston ring that would have an equivalent clamping force. Moreover, seal assembly 18 can have its clamping force easily selectively applied or released with one stroke of lever 164 to permit easy installation and removal of the engine 12. Further, the seal assembly 18 is more compliant than a piston ring of equivalent clamping force and therefore it will seal better than a piston ring type seal if the exhaust duct mating surfaces should become slightly out of round.

There has been disclosed heretofore the best embodiment of the invention presently contemplated. However, it is to be understood that various changes and modifications may be made thereto without departing from the spirit of the invention. That is, although this disclosure describes a seal ring design for use between an engine duct and an airframe mounted exhaust nozzle, it can be used in many other applications where it is necessary to have a seal that can tolerate misalignment and is easy to install.

Figure 10:
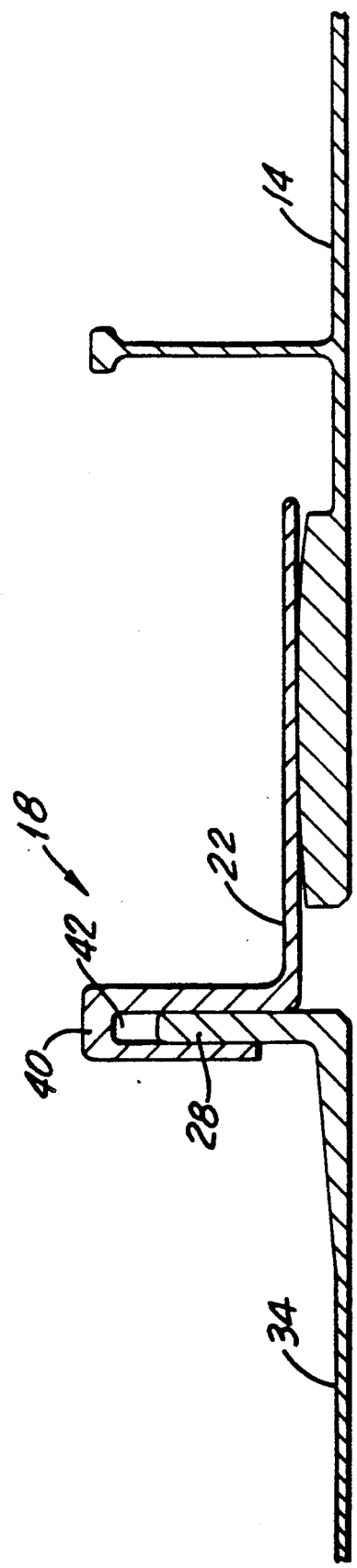
FIG. 10 is an alternate design of the seal assembly of FIG. 4.

Moreover, as shown in FIG. 10, the annular flange 40 with radial groove 42 may be provided on the seal ring 22 instead of conduit 34 as described above. In this case, annular sealing flange 28 is provided on conduit 34. Apart from the change or switch in location of flange 40 and flange 28, the seal assembly 18 of FIG. 10 functions in the same manner as that described previously. An advantage to this design is the elimination of collar portion 36 on conduit 34. This results in a simpler and more economical design.

What is claimed is:

1. A sealing ring apparatus for forming a sealed joint between a pair of axially-aligned conduits or ducts, said sealing ring apparatus comprising:
   a large seal ring segment comprising a first free end portion and a second free end portion, said first and second free end portions defining a circumferentially extending gap therebetween; and
   a small seal ring segment extending circumferentially across said gap so as to form a substantially continuous 360° seal ring, said small seal ring segment comprising a first end portion overlapping said first end portion of said large seal ring segment with a sliding fit and a second end portion circumferentially fixed with a tongue and groove fit to said second end portion of said large seal ring segment such that radial expansion and contraction of said seal ring effects circumferential sliding movement between said first free end portion of said large seal ring segment and said first end portion of said small ring segment.

2. The apparatus of claim 1, wherein said seal ring comprises an axially extending band for encircling said sealed joint and a radially outwardly extending annular flange.

3. A sealing ring assembly, comprising:
   an annular, substantially continuous 360 degree seal ring comprising a large ring segment circumferentially fixed to a small ring segment at first end portions of said large and small ring segments and with a circumferentially sliding fit at second end portions of said large and small ring segments, wherein said second end portion of said small ring segment circumferentially overlaps said second end portion of said large ring segment; and
   tensioning means connected to said large ring segment for applying circumferential tension across said sliding fit.

4. The seal assembly of claim 3, wherein said tensioning means comprises spring means.

5. The seal assembly of claim 3, wherein said tensioning means comprises means for selectively applying and releasing said circumferential tension.

6. A seal assembly for sealing an articulated joint formed between a first duct and a second duct, said assembly comprising:
   radially extending coupling means provided on said first duct;
   engagement means having a spherical surface portion provided on said second duct; and
   a seal ring radially interposed between said coupling means and said engagement means comprising a radial flange engaged with said coupling means and an annular band, extending axially from said radial flange, circumferentially fitted over and engaging said spherical surface portion of said engagement means.

7. The seal assembly of claim 6, wherein said seal ring further comprises a large ring segment connected to a small ring segment with a circumferentially sliding fit.

8. The seal assembly of claim 6, further comprising tensioning means connected to said seal ring for applying circumferential tension thereto.

9. The seal assembly of claim 6, wherein said coupling means comprises an annular radial flange formed on said first duct, said radial flange having an annular radially extending slot formed therein for slidably and sealingly receiving said seal ring radial flange.

10. The seal assembly of claim 6, wherein an axial clearance and a radial clearance are maintained between said first duct and said spherical surface portion of said engagement means.

11. The seal assembly of claim 6, wherein said first duct is connected to a jet engine and wherein said second duct comprises a jet engine exhaust duct.

12. The seal assembly of claim 6, wherein said seal ring radial flange comprises an annular radial flange having an annular radially extending slot formed therein for slidably and sealingly receiving said radially extending coupling means provided on said first duct.

13. The seal assembly of claim 7, wherein said small ring segment comprises a first end portion circumferentially fixed to said large ring segment and a second end portion which circumferentially overlaps said large ring segment along said sliding fit.

* * * * *